US012668993B2

(12) United States Patent
Meyer et al.

(10) Patent No.: US 12,668,993 B2
(45) Date of Patent: Jun. 30, 2026

(54) DOOR FRAME SMART LOCK FILLERS PLATE AND METHOD

(71) Applicants: Gary Meyer, Brighton, CO (US); Douglas C. Meyer, The Villages, FL (US)

(72) Inventors: Gary Meyer, Brighton, CO (US); Douglas C. Meyer, The Villages, FL (US)

( * ) Notice: Subject to any disclaimer, the term of this patent is extended or adjusted under 35 U.S.C. 154(b) by 29 days.

(21) Appl. No.: 18/904,824

(22) Filed: Oct. 2, 2024

(65) Prior Publication Data

US 2026/0092473 A1 Apr. 2, 2026

(51) Int. Cl.
*E05B 9/08* (2006.01)

(52) U.S. Cl.
CPC .................................... *E05B 9/08* (2013.01)

(58) Field of Classification Search
CPC ....................................................... E05B 9/08
USPC ........................................................... 70/129
See application file for complete search history.

(56) References Cited

U.S. PATENT DOCUMENTS

| | | | | | |
|---|---|---|---|---|---|
| 3,204,439 | A * | 9/1965 | Eads | E05B 9/08 | 411/968 |
| 4,637,237 | A * | 1/1987 | Witkoski | E05B 37/16 | 70/156 |
| 5,622,065 | A * | 4/1997 | Persiano | E05B 17/2057 | 70/105 |
| 10,202,797 | B1 * | 2/2019 | Header | E06B 3/26303 | |
| 11,927,049 | B1 * | 3/2024 | Mazur | E05C 9/004 | |
| 2024/0209678 | A1 * | 6/2024 | Mazur | E05C 9/22 | |

* cited by examiner

*Primary Examiner* — Nathan Cumar
(74) *Attorney, Agent, or Firm* — Scott L. Terrell

(57) ABSTRACT

A door frame fillers plate and method, for installation of a smart lock to a narrow lock stile, is provided. A main body has an interior face, an exterior face, a distal edge, and a lock stile adjacent edge. The interior face and the exterior face define a door depth spacer thickness. A first transverse handle aperture has a cross bore diameter and a center point being equidistant from an all points on the cross bore diameter. The center point and the lock stile adjacent edge define a backset length. A latch hole extends through the main body from the center point to the lock stile adjacent edge.

11 Claims, 5 Drawing Sheets

DOOR FRAME SMART LOCK FILLERS PLATE AND METHOD

CROSS REFERENCE TO RELATED APPLICATIONS

None.

STATEMENT OF FEDERALLY SPONSORED RESEARCH

None.

BACKGROUND OF THE INVENTION

1. Field of the Invention

The present invention relates to narrow lock stile door frames. In particular, it relates to a fillers plate for installation of a smart lock to a narrow lock stile door frame and method.

2. Description of the Related Art

Many insurance contracts, and a variety of state and local rules and regulates have been implemented, include a duty to monitor individual access to public and private swimming pools, tennis courts, and other recreational facilities. For example, many vacation rentals offer amenities such as a swimming pool, pickle ball courts, patios, or saunas. These areas are commonly accessible through the use of sliding doors. Sliding screen doors are also commonly used, in some regions, as doors between the interior rooms of a home and a courtyard, deck, balcony, patio, and a garden, backyard, barbecue or swimming pool area. Chain link and steel bar security fences are also commonly in use to limit access.

The requirement to limit access, to these recreational facilities, is in furtherance of a contractual duty, and a public policy to reduce the risk associated with accidental injury or death. In addition, access is often limited only to a specific individual for a limited term of residency. Any failure in enforcement can subject the property owner to severe monetary damages, fines or penalties. Thus, the use a smart lock technology is an ideal solution for the property owner to control and monitor access to these recreational facilities. With this technology the property owner has the ability to evidence satisfaction of the contractual or statutory duties of good faith and reasonable care.

Smart locks are well known, and have gained wide acceptance in the industry for monitoring individual access to secured areas. Smart locks are battery powered, and are often enabled with a Wi-Fi or Bluetooth signal processor, and incorporate a software application being useful for remote operation, access and control of a dead bolt latch assembly. Smart locks are also operable using a physical key and interior thumb latch. Some locks further include a fingerprint or voice recognition technology and related software for operation. These features make smart lock assemblies ideal for securing access to restricted locations wither by a specific individual or one with limited duration of residency.

Smart locks include an assembly of hardware components that make up the locking or latching mechanisms that are installed on doors, gates and dividers. These locks have an interior assembly, an exterior assembly, and trim components. The interior and exterior assemblies are operably connected to the door handle and latch assembly to retractably secure a latch or dead bolt through a strike plate. The strike plate is typically mortised into the door jamb.

In the United States, Smart locks are engineered for installation on a standard door, having a standard cross bore, latch hole bore, and backset dimension which is well accepted in the industry. Cross bore, is the diameter of the transverse handle aperture hole drilled for receiving the lock. The standard cross bore diameter is between 38 mm and 54 mm. Most of the current smart locks require the standard 54 mm cross bore for installation.

The cross bore forms a transverse handle aperture. The handle aperture is formed from the front side to the rear side of the standard door. The handle aperture is formed for connection of the door handles or knobs. The standard door thickness is 35 mm to 55 mm. The spindle is a drive bar that operates the drive of the lock, and connects the door handles or knobs.

A horizontal latch hole is formed from the proximate edge of the door to the center of the cross bore. The latch hole receives the dead bolt. The standard latch hole is 25 mm in diameter. Backset is the distance from the edge of the door to the center of the cross bore. The standard backset distance is either 60 mm, or 70 mm.

With either a screen or patio door, the door frames are mostly constructed using either an aluminum, steel or of a vinyl channel stock material. The stock material is cut to form a horizontal top, and base, which are connected with a pair of oppositely aligned vertical lock stiles. These narrow lock stiles do not allow ease in fitment with the standard smart lock assemblies, because: (1) the standard back set distance necessitates that the standard transverse handle aperture be positioned at the screening material; and (2) the screen, is not within the required door thickness for housing the latching assembly.

Thus, while the foregoing smart locks offer some utility, what is needed is a fillers plate, and method, for installation of a smart lock to a narrow lock stile. The present invention satisfies these needs.

BRIEF SUMMARY OF THE INVENTION

It is therefore an object of the present invention to provide a door frame fillers plate for installation of a smart lock of standard industry dimensions.

It is another object of the present invention to provide a method for installation of a smart lock to a narrow lock stile door frame.

To overcome the problems of the prior art, and in accordance with the purpose of the invention, as embodied and broadly described herein, briefly a door frame fillers plate for installation of a smart lock to a narrow lock stile, is provided. A main body has an interior face, an exterior face, a distal edge, and a lock stile adjacent edge. The interior face and the exterior face define a door depth spacer thickness. A first transverse handle aperture has a cross bore diameter and a center point being equidistant from an all points on said cross bore diameter. The center point and the lock stile adjacent edge define a backset length. A latch hole extends through the main body from the center point to the lock stile adjacent edge.

Additional advantages of the present invention will be set forth in part in the description that follows and in part will be obvious from that description or can be learned from practice of the invention. The advantages of the invention can be realized and obtained by invention as broadly describe and claimed below.

BRIEF DESCRIPTION OF THE SEVERAL VIEWS OF THE DRAWINGS

The accompanying drawings, which are incorporated in and which constitute a part of the specification illustrate at least one embodiment of the invention and, together with the description, explain the principles of the invention.

DETAILED DESCRIPTION OF THE INVENTION

Figure 1:
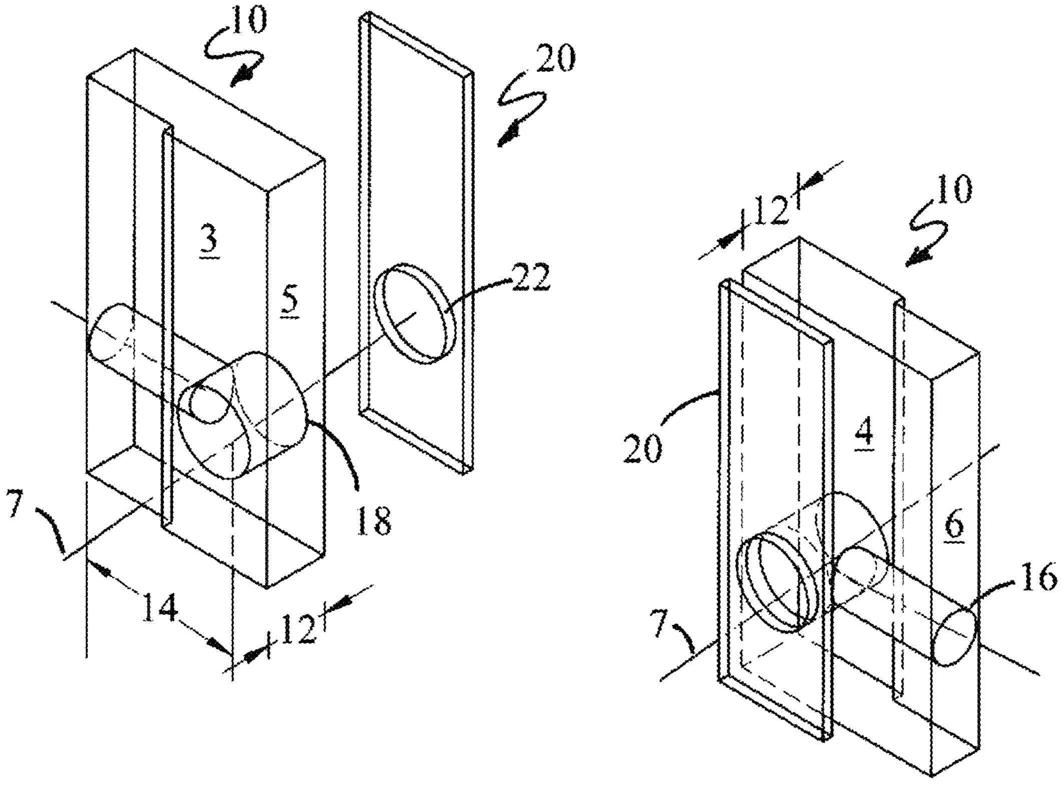
FIG. 1 is a front and back views, of the present invention, showing the fillers plate main body, batten plate with the backset spacer dimensions.
Figure 2:
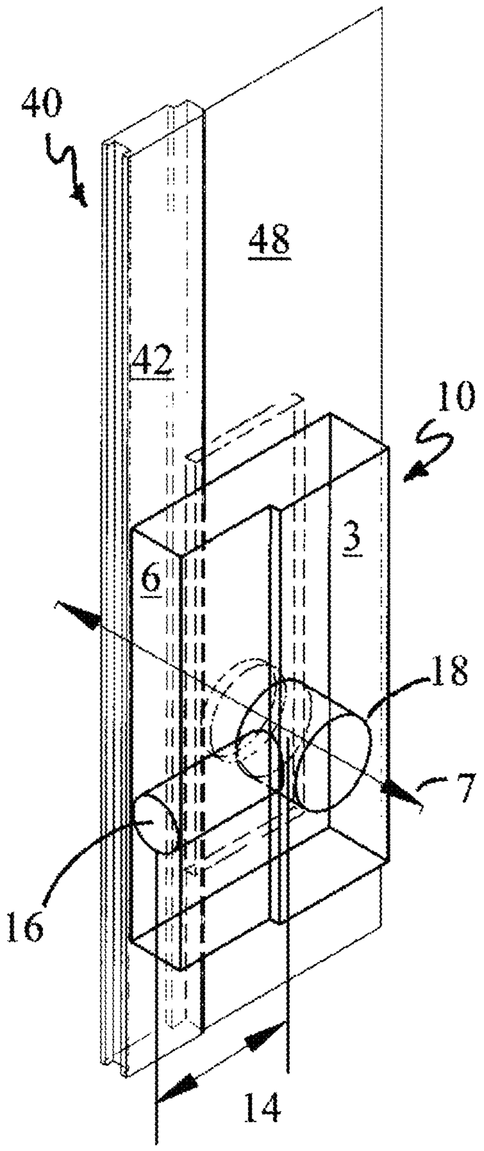
FIG. 2 is an isometric interior view of the present invention showing the backset dimension when positioned against the lock stile and screen of a sliding patio door.
Figure 3:
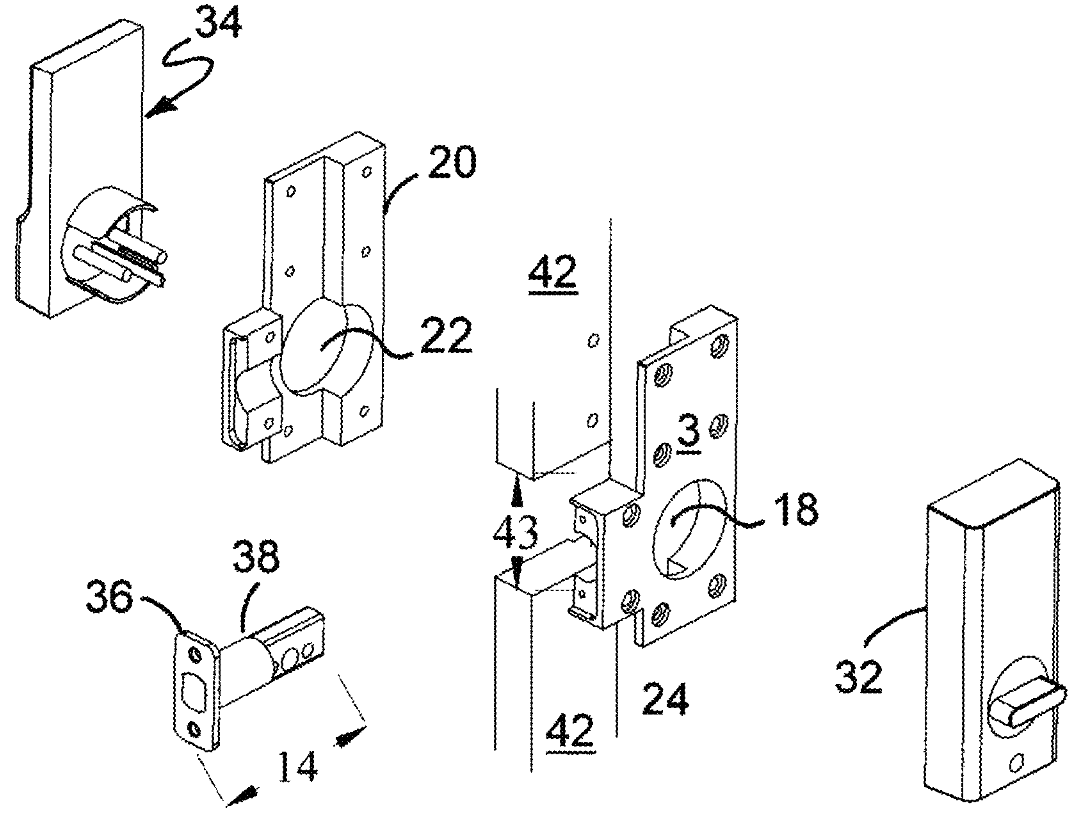
FIG. 3 is an exploded isometric view of the present invention showing a preferred embodiment where the main body includes a lug press-fit into the lock stile and secured with the batten plate.
Figure 4:
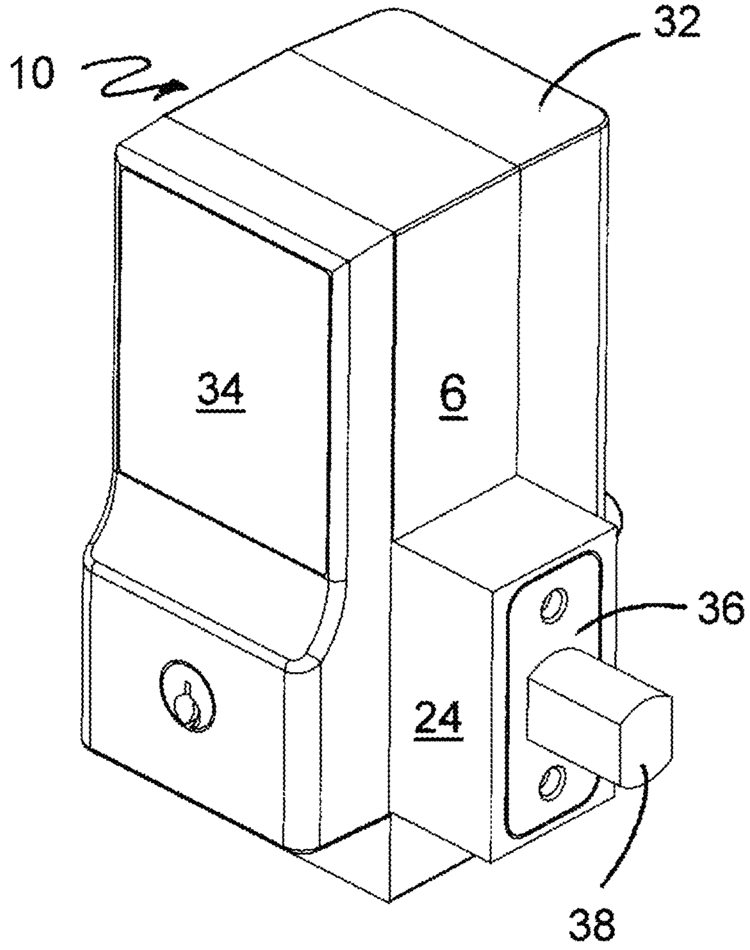
FIG. 4 is a isometric exterior view of the assembly of the present invention showing a preferred embodiment where a the lock stile adjacent edge of the main body includes a lug formation.
Figure 5:
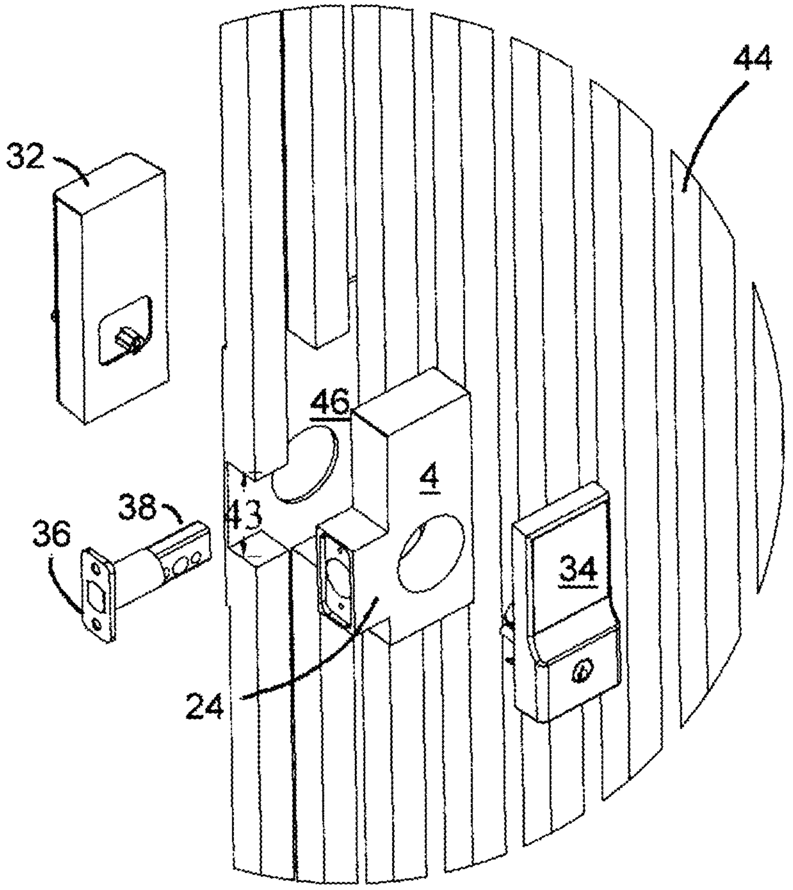
FIG. 5 is an exploded exterior view of yet another presently preferred embodiment, of the present invention, showing the main body having the lug formation being installed on a thin steel latch plate of a steel fence security gate.

Unless specifically defined otherwise, all technical or scientific terms used herein have the same meaning as commonly understood by one of ordinary skill in the art to which this invention belongs.

Although any of the methods and materials similar or equivalent to those described herein can be used in the practice or testing of the present invention, the preferred methods and materials are now described. Reference will now be made in detail to the presently preferred embodiments of the invention, examples of which are illustrated in the accompanying drawings wherein like numerals represent like features of the invention.

Referring now to the drawing figures, the present invention provides a door frame fillers plate 10 for installation of a smart lock to a narrow lock stile 46. The smart lock is of any type well known in the art, and is desirably battery powered, and enabled with a Wi-Fi and Bluetooth signal processor, in in operable input and output with a software application. These features are useful for remote operation, and monitoring access control of the dead bolt latch assembly 38. In use, the narrow lock stile 40 is the vertical tubular member 42, being constructed of a thin tubular metal rolled-stock, such as steel or aluminum, of a sliding screened door. The narrow lock stile 40 typically includes a recessed handle and latch mechanism. A screen fabric material 48 is press fit into a slotted portion of the tubular member 42, and secured with a rubber screen spline. The vertical lock stile 40, tubular member 42, is typically about 40 mm in width, and 13 mm in depth. Hence, the tubular member 42 is neither, wide enough to accommodate a standard smart lock backset length 14 (60-70 mm), nor has sufficient depth to occupy the required thickness of a standard wooden or metal door stile (35-55 mm), for installation of a smart lock. The sliding door may, but need not, be a sliding screened patio door for limiting and monitoring access to swimming pools, spas, or athletic courts.

The present invention is also contemplated for use, to monitor access through a heavy metal security fence, having a steel gate 44. The steel gate 44 typically has a steel latch plate 46 for mounting the smart lock interior assembly 32 and exterior assembly 34 to the metal plate 46 and latching assembly 36. In use, the present invention further provides a necessary door depth spacer thickness 12 to form the latch hole 16 and receive the dead bolt latching assembly 36, of a dimension commonly associated with a standard smart lock interior assembly 32, and exterior assembly 34.

The fillers plate 10, in accordance with the present invention, includes a main body. The main body is desirably rectangular, in shape, and is desirably laser-cut from a sheet of either a metal, or polymer stock. The main body is desirably sized, height and width, to be coextensive with any smart lock, interior assembly 32 and exterior assembly 34, which is well known in the art.

The main body has an interior face 3, an exterior face 4, a distal edge 5, and a lock stile adjacent edge 6. The interior face 3 and the exterior face 4 define a door depth spacer thickness 12. The door depth spacer thickness 12 is desirably not less than 29 mm, so that a latch hole 16, of the accepted standard dimension in the industry, can be formed therein.

The main body has transverse handle aperture 16. The transverse handle aperture 16 is a cross bore, preferably, with a standard diameter being in a range of 38-54 mm. The cross bore diameter has a center point 7. The center point 7 is equidistant from all points on the cross bore diameter. A distance measurement from the center point 7 to the lock stile adjacent edge 6, of the main body, is the backset length 14. The backset length 14 is, desirably, not less than 60 mm, nor greater than 70 mm, to receive the standard deadbolt latch assembly 38.

The main body also includes the latch hole 16. The latch hole 16 extends through the main body from the center point 7 to the lock stile adjacent edge 6. The latch hole 16 is desirably 25 mm, in diameter, and terminates at a mortised formation, in the lock stile adjacent edge 6, for receiving a latch plate 36, of any kind which is well known in the art. The latch plate 36 is fastened to the lock stile adjacent edge 6 using threaded fasteners.

In one presently preferred embodiment, the lock stile adjacent edge 6 protrudes in a lug formation 24. Here, in use, the narrow lock stile 40, tubular member is sectioned with a cut-out portion 43. The cut-out portion 43 is a section being removed and the section is dimensioned to be coextensive with the height and width (top wall to bottom wall) dimensions of the lug formation 24. In this manner, the fillers plate 10 is fastened to the narrow lock stile 40 with the lug formation 24 press fit into the cut-out portion 43 of the tubular member 42.

In yet another embodiment, of the present invention, the fillers plate 10 includes an exterior batten plate 20 having a second transvers handle aperture 22 being coextensive with the transverse handle aperture 18. Here, the batten plate 20 is desirably positioned between the exterior of the narrow lock stile 40 and the exterior assembly 34 of the smart lock, in order to reinforce the smart lock exterior assembly 34, or to adjust door depth spacer thickness 12, for ease in installation.

The present invention also provides a method for installation of the smart lock to the narrow lock stile 40. The steps, of the present method can be performed in any sequence, and are not limited to the sequence of the elements of the method, as claimed.

Here, a door frame narrow lock stile 40 is provided. The narrow lock stile 40 has an interior face, an exterior face, and a door jamb adjacent side. A smart lock is provided. The smart lock has an interior assembly 32, an exterior assembly 34, and a deadbolt latching assembly 38.

The door frame fillers plate 10 is provided. The door frame fillers plate 10 has a main body including an interior face 3, an exterior face 4, a distal edge 5, and a lock stile adjacent edge 6. The interior face 3 and the exterior face 4 define a door depth spacer thickness 12 being the required thickness, between the interior assembly 32 and the exterior assembly 34, which is the necessary standard dimension for installation of any smart lock which is well accepted in the industry. A first transverse handle aperture 18 has a cross bore diameter and a center point 7 being equidistant from an all points on said cross bore diameter. The center point 7 and the lock stile adjacent edge 6 define a backset length 14, and a latch hole 16 extends through the main body from the center point 7 to the lock stile adjacent edge 6.

The main body is positioned adjacent to the narrow lock stile frame member 42, so that the center point 7 of the handle aperture 18 fits the predetermined distance of the desired backset length 14. The dead bolt latching assembly 38 is fit through the latch hole 16, and the dead bolt latching assembly 38 is aligned with the center point 7 at the backset length 14.

The main body is fastened between the smart lock interior assembly 32, and the exterior assembly 34 by connecting the interior assembly 32 and exterior assembly 34 through the dead bolt latching assembly 38, with a spindle and a plurality of threaded fasteners, at the door depth spacer thickness 12.

With this method, the backset length 14 is desirable predetermined in a range of 60-70 mm, with the door depth spacer thickness 12 being greater than 41 mm.

In one presently preferred embodiment the method includes the installation of the exterior batten plate 20. Here, the method includes the steps of providing the exterior batten plate 20, The exterior batten plate 20 has a second transvers handle aperture 22 which is dimensioned to be coextensive with the first transverse handle aperture 18. This method further includes the step of positioning the exterior batten plate 20 against the narrow lock stile 40 exterior surface so that the second handle aperture 22 aligns, transversely, with the first transverse handle aperture 18 before fastening the main body between the smart lock interior assembly 32 and the exterior assembly 34 through the dead bolt latching assembly 38, at the door depth spacer thickness 12.

While the present invention has been described in connection with the embodiments as described and illustrated above, it will be appreciated and understood by one of ordinary skill in the art that many modifications may be made in the fillers plate and method for use, thereof, in accordance with the present invention, without departing from the true spirit and scope of the invention as described and broadly claimed herein.

We claim:

1. A door frame fillers plate for installation of a smart lock to a narrow lock stile, comprising:

(a) a main body having an interior face, an exterior face, a distal edge, and a lock stile adjacent edge, said interior face and said exterior face defining a door depth spacer thickness, wherein said main body being desirably sized, height and width to be coextensive with said smart lock to be installed;

(b) a first transverse handle aperture having a cross bore diameter and a center point being equidistant from an all points on said cross bore diameter, wherein said center point and said lock stile adjacent edge define a backset length; and (c) a latch hole extending through said main body from said center point to said lock stile adjacent edge.

2. The door frame fillers plate according to claim 1, wherein said backset length is in a range of 60-70 mm.

3. The door frame fillers plate according to claim 1, wherein said door depth spacer thickness is greater than 29 mm.

4. The door frame fillers plate according to claim 1, further comprising an exterior batten plate having a second transvers handle aperture being coextensive with said transverse handle aperture.

5. The fillers plate according to claim 1, wherein the narrow lock stile is a sliding door metal hollow tubular member.

6. The fillers plate according to claim 1, wherein the narrow lock stile is a metal gate steel plate member.

7. The fillers plate according to claim 1, wherein the narrow lock stile includes a cut-out portion, and said lock stile adjacent edge includes a lug formation adapted for press-fit into said cut-out portion.

8. A method for installation of a smart lock to a narrow lock stile, comprising the steps of:

(a) providing a door frame narrow lock stile member having an interior face, an exterior face, and a door jamb adjacent side;

(b) providing a smart lock having an interior assembly, an exterior assembly, and a deadbolt latching assembly;

(c) providing a door frame fillers plate having a main body including an interior face, an exterior face, a distal edge, and a lock stile adjacent edge, said interior face and said exterior face defining a door depth spacer thickness, wherein said main body being desirably sized, height and width to be coextensive with said smart lock to be installed; a first transverse handle aperture having a cross bore diameter and a center point being equidistant from an all points on said cross bore diameter, wherein said center point and said lock stile adjacent edge define a backset length; and a latch hole extending through said main body from said center point to said lock stile adjacent edge;

(d) positioning said main body adjacent to said narrow lock stile so that said center point of said handle aperture fits a predetermined distance of said backset length;

(e) fitting said dead bolt latching assembly through said latch hole;

(f) aligning said dead latching assembly with said center point at said backset length; and (g) fastening said main body between said smart lock interior assembly and said exterior assembly by connecting said interior assembly and said exterior assembly using said dead bolt latching assembly, at said door depth spacer thickness.

9. The method according to claim 8, wherein said backset length is in a range of 60-70 mm.

10. The method according to claim 8, wherein said door depth spacer thickness is greater than 29 mm.

11. The method according to claim 8, further comprising the steps of providing an exterior batten plate having a second transvers handle aperture being coextensive with said first transverse handle aperture, and further including the step of positioning said batten plate against said lock stile exterior surface so that said second handle aperture aligns, transversely, with said first transverse handle aperture before fastening said main body between said smart lock interior assembly and said exterior assembly by connecting said interior assembly and said exterior assembly using said dead bolt latching assembly, at said door depth spacer thickness.

* * * * *